(No Model.)
F. PLUMB.
DITCHING MACHINE.
No. 298,887. Patented May 20, 1884.
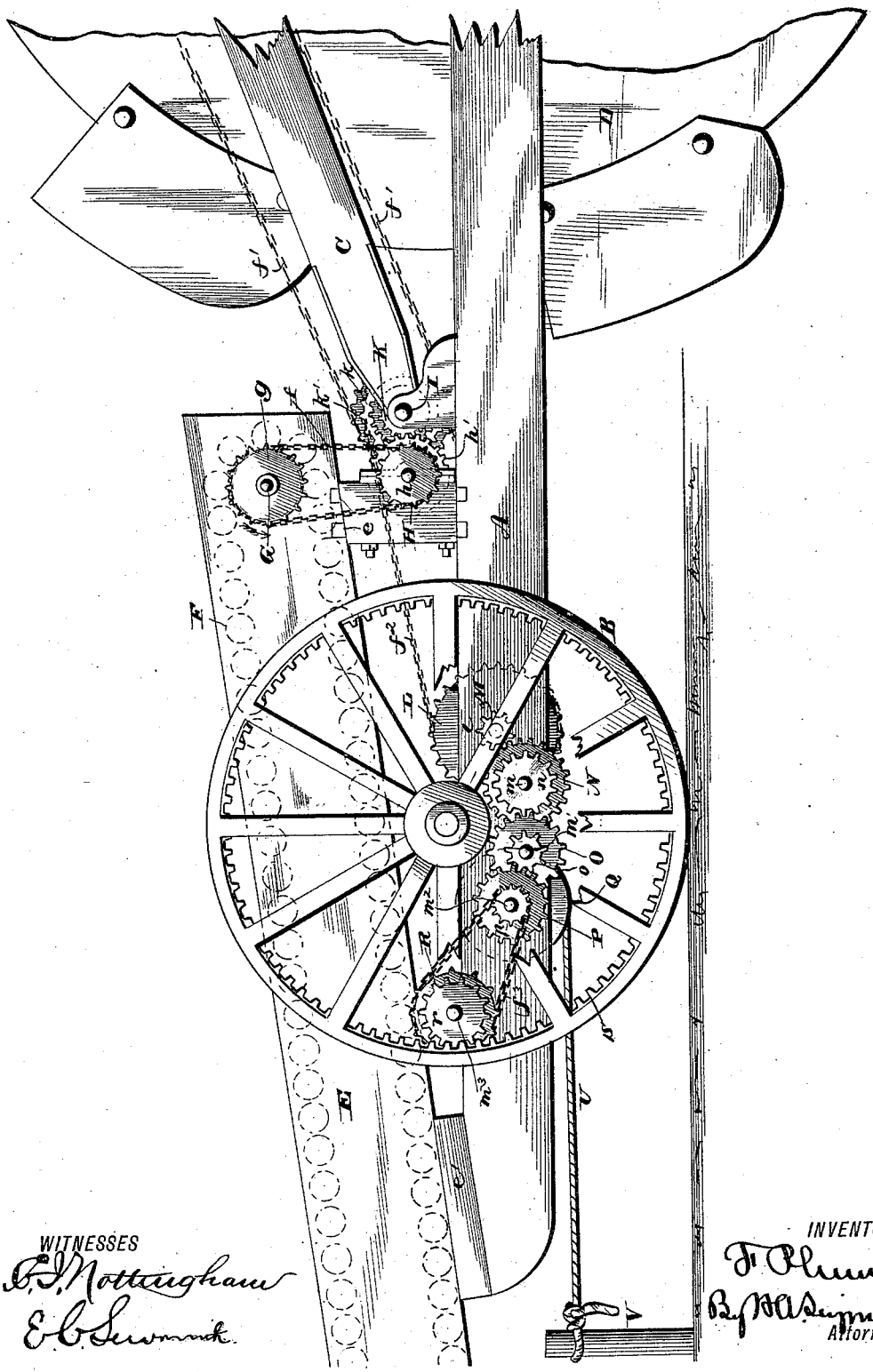
WITNESSES
INVENTOR

UNITED STATES PATENT OFFICE.

FAWCETT PLUMB, OF STREATOR, ILLINOIS.

DITCHING-MACHINE.

SPECIFICATION forming part of Letters Patent No. 298,887, dated May 20, 1884.

Application filed February 1, 1884. (No model.)

*To all whom it may concern:*

Be it known that I, FAWCETT PLUMB, of Streator, in the county of La Salle and State of Illinois, have invented certain new and useful Improvements in Ditching-Machines; and I do hereby declare the following to be a full, clear, and exact description of the invention, such as will enable others skilled in the art to which it appertains to make and use the same.

My invention relates to an improvement in ditching-machines, the object being to provide an effective ditching-machine actuated by horse-power.

With this end in view my invention consists in a main frame mounted upon wheels, a swinging frame carrying a cutting wheel journaled therein, a horse-power mounted thereon, and mechanism whereby the power is transmitted to the cutting-wheel and driving-wheels.

My invention further consists in certain features of construction and combinations of parts, as will be fully described, and pointed out in the claims.

The accompanying drawing is a view in side elevation of that portion of the machine embodying the horse-power and transmitting mechanism.

The main frame A, its supporting-wheels B, and the swinging frame C, with the exception of such slight modifications as will be fully described herein, are preferably constructed in the manner set forth at length in the specification, forming a part of Letters Patent No. 244,400, granted to me July 19, 1881. The cutting-wheel D is preferably constructed and mounted in the manner fully described in the specification, forming a part of my application for Letters Patent filed October 17, 1883.

E represents a railway horse-power or tread-mill mounted upon the forward end of the main frame A, and centering conveniently nearly over the axle of the forward truck. The forward end of the railway-box rests in an elevated position upon a cross-beam or blocks $e$, secured on the main frame, and the rear end rests on a cross-beam or blocks $e'$, secured to the extreme forward end of the main frame.

The railway horse-power or tread-mill E may be of any approved construction, consisting of the endless belt F, passing around and constructed to revolve the drum or shaft G, on which shaft the sprocket-wheel $g$ is rigidly secured. The shaft H is journaled transversely to the main frame in boxes secured to the cross-beam or blocks $e$, and carries the sprocket-wheel $h$ and cog-wheel $h'$, rigidly secured thereon. A chain belt, $f$, connects the sprocket-wheels $g$ and $h$. The cog-wheel K and the sprocket-wheels $k$ and $k'$ are secured rigidly upon the shaft I, upon which shaft the swinging frame C is mounted. The cog-wheel $h'$ is constructed and situated to engage the cog-wheel K, and thereby turn the shaft I and sprocket-wheels $k$ and $k'$. The sprocket-wheel $k'$ is connected with a sprocket-wheel, (not shown,) the latter being in contact with the cutting-wheel D by a chain belt, $f'$, by means of which motion is transmitted to the cutting-wheel. The sprocket-wheel $k$ is connected with the sprocket-wheel L by the chain belt $f^2$, the wheel L being rigidly secured on the shaft M, journaled in the main frame just back of the forward truck. The shaft M carries the toothed pinion $l$, which engages the toothed wheel N, rigidly secured on the shaft $m$, journaled in the main frame, and carrying the toothed pinion $n$. The latter engages the toothed wheel O, rigidly secured on the shaft $m'$, and carrying the toothed pinion $o$. The toothed pinion $o$ engages the toothed wheel P, rigidly secured on the shaft $m^2$, journaled in the main frame, and carrying the sprocket-wheel $p$ and the drum Q. The sprocket-wheel R is rigidly secured on the shaft $m^3$, journaled on the main frame, and carrying the toothed pinion $r$, the latter being so situated as to engage the internal toothed rim, S, on the truck-wheel B. The sprocket-wheel R is connected with the sprocket-wheel $p$ by the chain belt $f^3$. The drum Q is constructed and arranged to wind upon itself the wire cable U, one end of which may be secured to the stake or post V, set firmly in the ground.

The operation of the machine is as follows: The motion of the endless belt F of the horse-power causes the sprocket-wheel $g$ to rotate. This motion is transmitted to the wheel $h$ by the belt $f$ in the direction denoted by the arrow. The motion of the wheel $h$ is communicated to the shaft I and wheels thereon by the contact of the cog-wheels $h'$ and K. The motion of the wheel $k'$ is transmitted to the cutting-wheel D through the chain belt $f'$, and the motion of the wheel $k$ is transmitted to wheel L through the belt $f^2$. The motion of L is communicated to N by the contact of the cog-wheels $l$ and N, from N to O by the contact of $n$ and O, from O to P and drum Q by the contact of $o$ and P, and from P to R by the belt $f^3$. The motion of R is communicated to the truck-wheel B by the contact of the cog-wheel $r$ with the toothed rim S on the said truck-wheel, and the whole machine is propelled by the motion of the truck-wheel B. The forward motion of the machine is so reguluted by this system of gearing as to keep the cutting-wheel up to its maximum work.

Either the cable or the pinion $r$ can be employed separately for imparting a forward movement to the machine; but I prefer to employ them both, as one assists the other and prevents any retrograde or lost motion. The post V being set firmly in the ground, one end of the cable U is secured to it and the other end to the drum Q. It will be readily seen that the motion of the drum will now wind up the cable and force the machine forward, as before.

It is evident that slight changes in the positions and construction of the several parts may be made without departing from the spirit and scope of my invention. I do not, therefore, wish to limit myself to the exact construction and arrangement herein set forth.

Having fully described my invention, what I claim as new, and desire to secure by Letters Patent, is—

1. In a ditching-machine, the combination, with an excavator, of a railway or tread-mill horse-power combined with the supporting-frame of the excavator, and mechanism for transmitting motion from the horse-power to the excavator and propelling-wheel of the machine.

2. In a ditching-machine, the combination, with a rotary excavator, of a railway or tread-mill horse-power, combined with the supporting-frame of the excavator, and mechanism for transmitting the motion of the horse-power to the excavator and propelling-wheel, substantially as set forth.

3. In a ditching-machine, the combination, with a main frame supported upon wheels, and a railway or tread-mill horse-power secured upon the main frame, of a driving mechanism constructed to engage one of the supporting-wheels, and mechanism constructed to transmit the motion of the horse-power to the driving mechanism, substantially as set forth.

4. In a ditching-machine, the combination, with a main frame supported upon wheels, and a railway or tread-mill horse-power secured upon the main frame, of a toothed rim attached to one of the supporting-wheels, and mechanism constructed to transmit the motion of the horse-power to the toothed rim, substantially as set forth.

5. In a ditching-machine, the combination, with a main frame supported upon wheels, and a railway or tread-mill horse-power secured upon the main frame, of a drum and cable, and mechanism constructed and arranged to transmit the motion of the horse-power to the drum and cable, substantially as set forth.

6. In a ditching-machine, the combination, with a main frame supported upon wheels, and a railway or tread-mill horse-power secured upon the main frame, of a supporting-wheel provided with teeth, a drum constructed to wind a cable, and mechanism constructed to transmit the motion of the horse-power to the wheel and drum simultaneously, substantially as set forth.

In testimony whereof I have signed this specification in the presence of two subscribing witnesses.

FAWCETT PLUMB.

Witnesses:
 JOHN B. PLUMB,
 GEORGE GOULDING.